United States Patent
Wang et al.

(10) Patent No.: US 8,243,162 B2
(45) Date of Patent: Aug. 14, 2012

(54) AUTOMATIC WHITE BALANCING USING METER SENSORS

(75) Inventors: Xiaoyong Wang, Sunnyvale, CA (US); Jizhang Shan, Cupertino, CA (US); Donghui Wu, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 765 days.

(21) Appl. No.: 12/333,104

(22) Filed: Dec. 11, 2008

(65) Prior Publication Data

US 2010/0149403 A1 Jun. 17, 2010

(51) Int. Cl.
*H04N 9/73* (2006.01)
(52) U.S. Cl. ..................... 348/223.1; 348/360
(58) Field of Classification Search ............... 348/223.1, 348/227.1, 228.1, 516, 335
See application file for complete search history.

(56) References Cited

U.S. PATENT DOCUMENTS

| 7,015,955 B2 * | 3/2006 | Funston et al. ............ 348/223.1 |
| 7,432,961 B2 * | 10/2008 | Takeshita ................... 348/227.1 |
| 7,912,279 B2 * | 3/2011 | Hsu et al. ....................... 382/162 |
| 7,956,886 B2 * | 6/2011 | Murayama ....................... 348/42 |
| 2002/0106206 A1 * | 8/2002 | Takeshita ....................... 396/429 |
| 2004/0233295 A1 * | 11/2004 | Hoshuyama ............... 348/222.1 |
| 2005/0219379 A1 * | 10/2005 | Shi ............................... 348/223.1 |
| 2006/0290957 A1 * | 12/2006 | Kim et al. ....................... 358/1.9 |
| 2009/0231468 A1 * | 9/2009 | Yasuda ........................... 348/234 |

* cited by examiner

*Primary Examiner* — Chieh M Fan
*Assistant Examiner* — Fayez Bhuiyan
(74) *Attorney, Agent, or Firm* — Blakely Sokoloff Taylor & Zafman LLP

(57) ABSTRACT

An image sensor system includes an image sensor that can be exposed with light from an illuminated scene to produce a secondary image, a meter sensor that can be exposed with light from the illuminated scene to produce a meter secondary image, and an image processor. The image processor can be configured to determine an average pixel color in the secondary image. The image processor can also be configured to determine a white balancing point in response to the secondary image average pixel color, the meter secondary image, meter calibration information for the meter sensor, and the image calibration information for the image sensor.

32 Claims, 5 Drawing Sheets

AUTOMATIC WHITE BALANCING USING METER SENSORS

TECHNICAL FIELD

This disclosure relates generally to imaging and in particular, but not exclusively, relates to image processing.

BACKGROUND INFORMATION

Integrated circuits have been developed to reduce the size of components used to implement circuitry. For example, integrated circuits have been using ever-smaller design features, which reduces the area used to implement the circuitry, such that design features are now well under the wavelengths of visible light. With the ever-decreasing sizes of image sensors and the individual pixels that are part of a sensing array, it is important to more accurately capture and process charges that are formed when incident light illuminates the sensing array. More accurately processing photonically generated charges helps to maintain or improve the quality of electronic images captured by the sensing arrays of ever-decreasing sizes.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an image sensor system with automatic white balancing are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. The term "or" as used herein is normally meant to encompass a meaning of an inclusive function, such as "and/or."

Throughout this specification, several terms of art are used. These terms are to take on their ordinary meaning in the art from which they come, unless specifically defined herein or the context of their use would clearly suggest otherwise. "Color" is defined herein as light that having a certain wavelength or having a range of wavelengths. For example, different colors of light can be red, blue, or green, with each color containing a range of wavelengths of light that is different from other named colors. The frequencies and ranges of wavelengths include invisible wavelengths of light as well.

Figure 1:
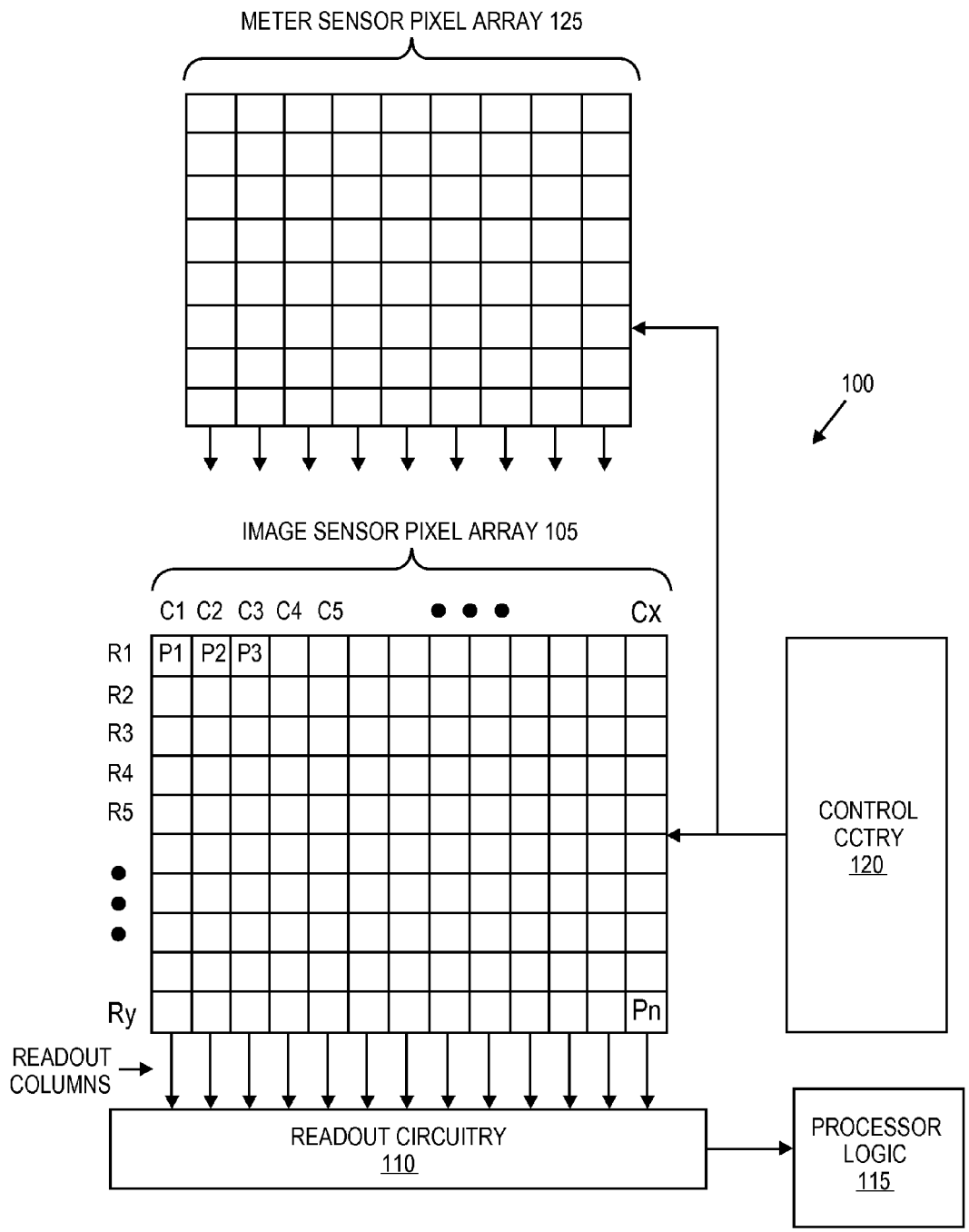
FIG. 1 is a block diagram illustrating an imaging sensor system 100, in accordance with an embodiment of the invention.

FIG. 1 is a block diagram illustrating an imaging sensor system 100, in accordance with an embodiment of the invention. The illustrated embodiment of imaging sensor system 100 includes a pixel array 105, readout circuitry 110, processing logic 115, control circuitry 120, and meter sensor 125.

Pixel array 105 is a two-dimensional ("2D") array of backside illuminated imaging pixels (e.g., pixels P1, P2 . . . , Pn). Array 105 typically contains at least thousands of pixels and often contains more than a million pixels. A lesser number of pixels is shown for the purpose of clarity. In one embodiment, each pixel is an active pixel sensor ("APS"), such as a complementary metal-oxide-semiconductor ("CMOS") imaging pixel. Each pixel typically has a photosensitive region, such as a photodiode region, which is used to collect charge that is generated by light shining on the pixel. When light of different color is captured by different adjacent pixels (such as when color filters are provided according to a Bayer dither pattern), the adjacent pixels can be considered to "subpixels" because the subpixels can be combined (using an additive color table, for example) to produce a single display pixel. As illustrated, each pixel is arranged into a row (e.g., rows R1 to Ry) and a column (e.g., column C1 to Cx) to acquire image data of a person, place, or object, which can then be used to render a 2D image of the person, place, or object. Each pixel can comprise subpixel triplets for different colors.

After each pixel has acquired its image data or image charge, the image data is readout by readout circuitry 110 and transferred to processing logic 115. Readout circuitry 110 may include amplification circuitry, analog-to-digital conversion circuitry, or otherwise. Processing logic 115 can be an image processor that is used to process the image data by manipulating the image data by applying post image effects (e.g., crop, rotate, remove red eye, adjust brightness, adjusting hue, saturation, and contrast, and the like). In one embodiment, readout circuitry 110 may read out a row of image data at a time along readout column lines (illustrated) or may readout the image data using a variety of other techniques (not illustrated), such as a serial readout or a full parallel readout of all pixels simultaneously.

Control circuitry 120 is coupled to pixel array 105 to control operational characteristic of pixel array 105. For example, control circuitry 120 may generate a shutter signal for controlling image acquisition for the image sensor pixel array 105. Control circuitry 120 is also coupled to meter array 125 to control operational characteristic of meter sensor 125. Control circuitry 120 may generate a shutter signal for controlling image acquisition for the meter sensor pixel array 125. Readout circuitry 110 may read all (or selected) pixels from the meter sensor 125, as described further below.

Meter sensor 125 is typically an array of pixels having less resolution then the pixel array 105. In various embodiments, arrays of pixels having lesser resolution, greater resolution, or even equal resolution can be used. For example, a meter sensor having lesser resolution can be used when the cost of the lesser resolution sensor is significantly less than the cost of the sensor used for the main pixel array. In another example, a meter sensor can have the same resolution as the sensor used for the main pixel array (e.g., the meter sensor can be the same design as the sensor used for the main pixel array) to minimize component counts and packaging costs.

Figure 2:
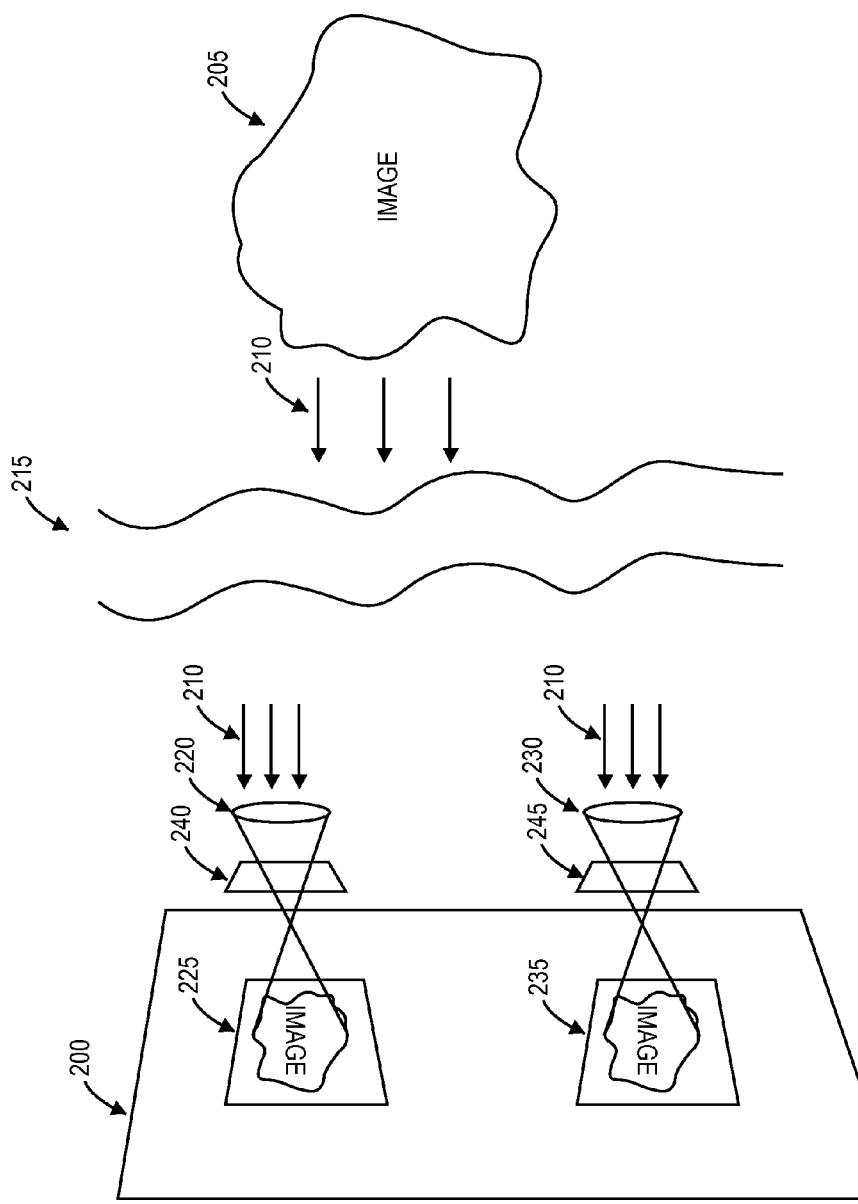
FIG. 2 is an illustration of a sample imaging sensor system.

FIG. 2 is an illustration of a sample imaging sensor system. System 200 includes pixel array 225, lens 220, meter sensor 235, and lens 230. Infra-red stop filters 240 and 245 can be provided to such that non-visible light energy is reduced in images produced by system 200. In operation, image 205 is illuminated and produces light rays 210 in accordance with the illuminated image. The light rays 210 traverse distance 215 such that the light rays 210 are substantially parallel (although stereoscopic and parallax information from the image 205 may be present) at the time the light rays 210 encounter each of lenses 220 and 230.

Lenses 220 and 230 are typically objective lenses and arranged such that similar images are produced on each of the pixel array 225 and the meter sensor 235. In one embodiment where meters sensor 235 is smaller than a pixel array 225, lens 230 can be smaller than lens 220. In addition to (or in conjunction with) being a smaller lens, lens 230 can be located more closely to meters sensor 225 such that similar images are formed on the face of meter sensor 225 and pixel array 235. Thus, the similar images can be different sizes. The similar image of the meter sensor 235 can also include more color information (than the image of the pixel array) when a diffusion lens is used because the angle of incident light of the meter sensor 235 is increased.

Lens 220 in another embodiment can be a diffusion lens with or without focusing properties. A diffusion lens can produce a "smeared" image that can represent average colors present in the image. (The image can be either inverted or non-inverted from the true image, depending on the optics used.)

The color tones of a scene in an image can vary depending on which of varying illumination sources are used when an image of the scene is taken. Varying kinds of illumination can produce incandescent light, fluorescent light, and daylight, each of which has different power spectral distributions. White balancing (WB) is the process of removing "unrealistic" color casts, such that objects that would appear to be white to a person (when viewed in person) have a similar white appearance in an image produced by an image sensor. White balancing can be accomplished by adjusting the gains of the three primary color channels (e.g., red, green, and blue) used in CMOS image sensors. The capability to perform white balancing automatically without user intervention is often called auto white balancing (AWB).

A widely used AWB algorithm is based on a "gray-world" assumption. The gray-world assumption operates by assuming that the average of the color information in a scene is gray or colorless. Another commonly used assumption is the "white-world" assumption, which operates by assuming that the brightest point in a scene is white, where red, green, and blue are all equal to each other.

Although these assumptions can be used to produce realistic results in many situations, they often fail when the scenes contain multiple illuminants. An example of an image having multiple illuminants can be an outdoor scene having a wide shadow formed from direct sunlight (where the sun is one of the illuminants, and reflected light—such as skylight—can be other sources of illuminants). When common AWB methods are applied to these scenes, often only one part of an image is (correctly) white balanced, which results in other parts having incorrect color casts. When AWB methods try to AWB all parts of an image using common parameters, the resulting image is often less than satisfactory, especially when compared with a properly corrected view of the image.

Figure 3:
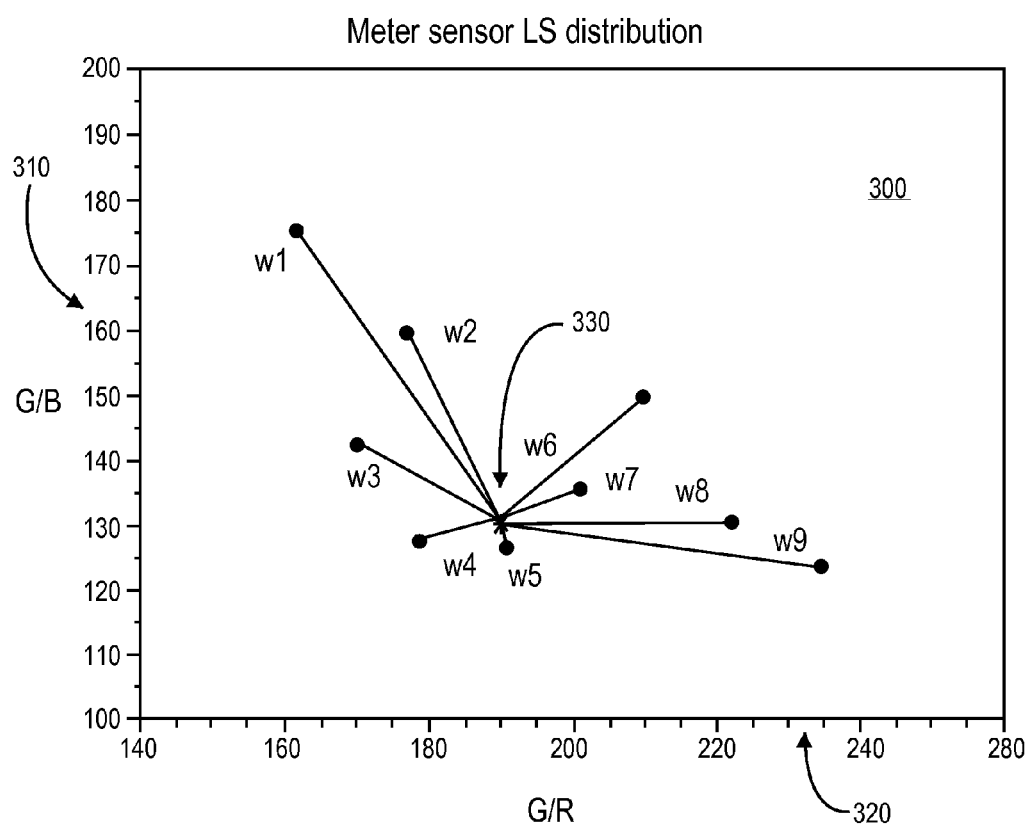
FIG. 3 is an illustration of white balancing using a meter sensor.

FIG. 3 is an illustration of white balancing using a meter sensor. The meter sensor is calibrated by illuminating a test scene with a variety of typically used light sources to produce sample points (or "clusters") in a color space 300, having a G/B (a green amplitude divided by a blue amplitude) vertical axis 310 and a G/R (a green amplitude divided by a red amplitude) horizontal axis 320.

An example test scene can be a monochromatic subject such as a black and white newspaper or a standard gray board. The test scene is sequentially illuminated using selected light sources that are typically encountered in taking pictures. Each selected light typically has its own color characteristics, and each pixel of an image captured from the illuminated scene (using the meter sensor, for example) falls around a single point (such as cluster w1 for a first selected light) in the color space.

The cluster can be resolved to a single point by, for example, determining the average color value for each color in the captured image. For example, the mean value for all red, blue, green values of each pixel can be calculated by summing all of the sampled red, blue, and green values respectively and then dividing the summed values by the total number of pixels sampled (which, for example, can be equal to or less than the number of pixels in the captured image). The point can be located, for example, in the vertical direction by dividing the mean green value by the mean blue value, and in the horizontal direction by dividing the mean green value by the mean red value.

Each test exposure (that results from using one of the nine used light sources) is classified as one of nine calibration clusters w1 through w9. More or less light sources (typically having mutually differing color characteristics) can be used (which typically would result in an equal number of clusters). Each calibration cluster can be resolved to a point as described above.

Point 330 is determined from color information from another image, such as a picture captured when a consumer takes a picture using a camera in accordance with the present disclosure. In this example, the camera includes a meter sensor (as well as the conventional image sensor) that is used to capture a secondary image. Point 330 can be used as a balancing point that represents a mean color value of the secondary image. The coordinates of point 330 in color space 300 can be determined in a similar manner as described above for determining a point for a calibration cluster.

Weighting factors (also referred to as "weights") can be determined (at least in part) by calculating the distances from point 330 to each of the calibration cluster points in color space 300. The distances can be calculated using geometric principles and the coordinates of the points. The distances can be illustrated by the length of the line segments extending between point 330 and each calibration cluster point.

Figure 4:
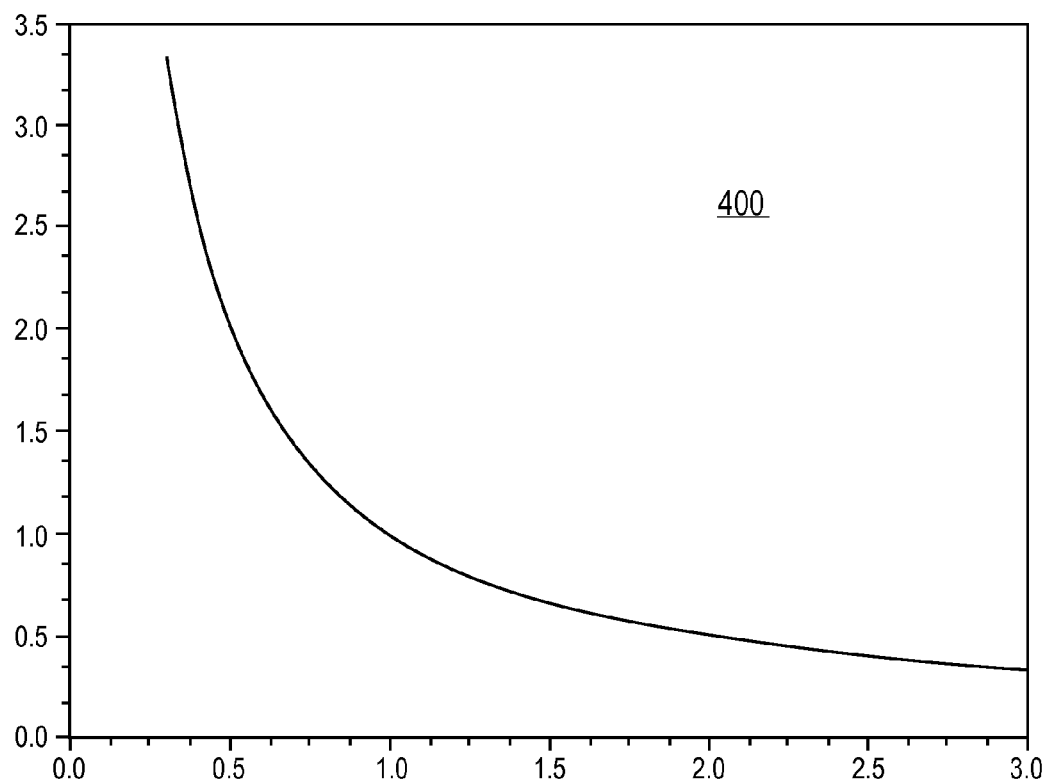
FIG. 4 illustrates an example weighting function that provides normalizes weights as a function of a supplied distance.

FIG. 4 illustrates an example weighting function that provides normalizes weights as a function of a supplied distance. The example weighting function 400 can be similar to a function such as $y=1/x$ over a limited range. For example, each weight for each cluster can be calculated in accordance with $Vi=F(Di)$, where $Vi$ is the weight for each cluster, $Di$ is the distance of the cluster from point 330, and $F( )$ is the weighting function. Thus each weight can be determined by using each of the calculated distances to a selected calibration cluster. In an embodiment, weighting factors produced from smaller distances are larger than weighting factors produced from larger distances.

The weighting factors can be normalized such that the sum of the weighting factors is one (as in "unity"). For example, the weighting factors can be summed using $S=\mathrm{Sum}\,(Vi)=1$, where S is the sum of the weighting factors, and Vi is the series of each weighting factor. Each weighting factor can be normalized using Wi=Vi/S, where Wi is each normalized weighting factor, Vi is each weighting factor, and S is the sum of the weighting factors.

Figure 5:
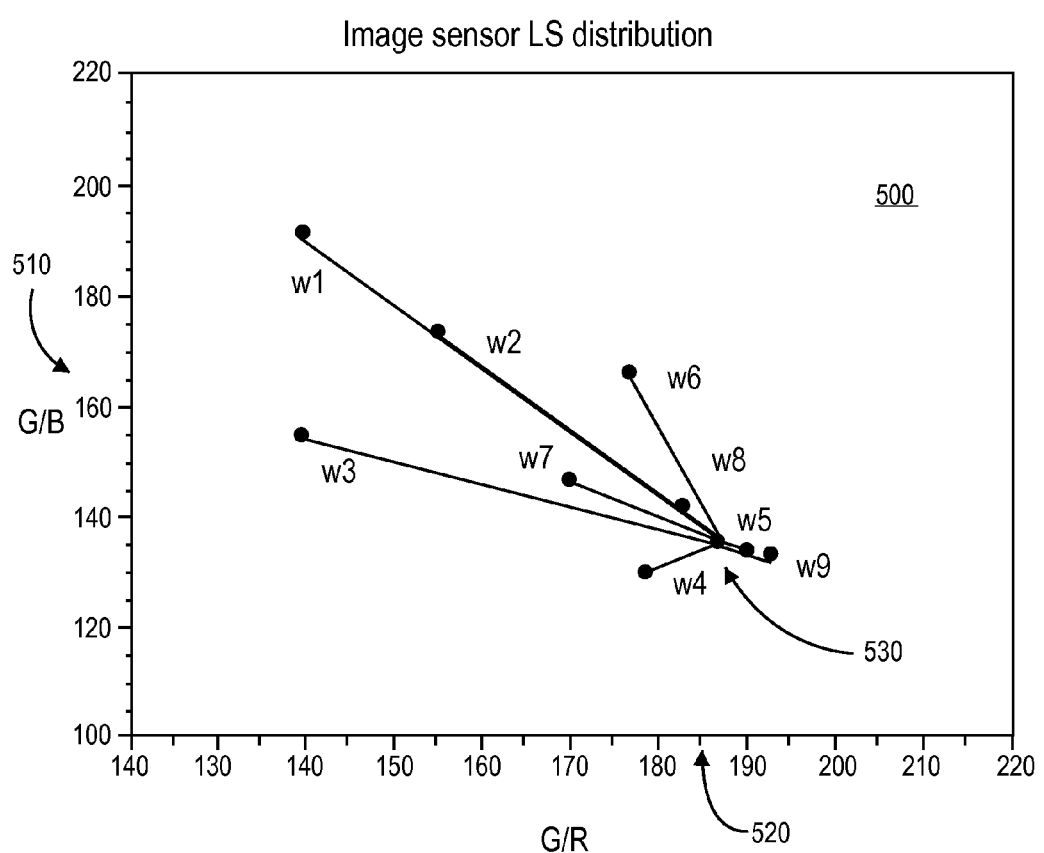
FIG. 5 is an illustration of white balancing using an image sensor.

FIG. 5 is an illustration of white balancing using an image sensor. The image sensor is calibrated by illuminating a test scene with a variety of typically used light sources to produce sample points (or "clusters") in a color space 500 have a G/B (a green amplitude divided by a blue amplitude) vertical axis 510 and a G/R (a green amplitude divided by a red amplitude) horizontal axis 520. The test scene can be an example monochromatic subject, as described above, that can be sequentially illuminated using the selected light sources that are used to calibrate the image sensor. Thus the image sensor has cluster points (w1 through w9) that correspond to (but do not necessarily have the same coordinates as) the similarly named cluster points of the meter sensor.

An adjusted balancing point can be determined using ABP=sum (Wi*LIi), where ABP is an adjusted balancing point, Wi is each normalized weighting factor, and LIi is each cluster point of the image sensor. An example adjusted balancing point is illustrated as point 530.

As discussed above, a scene that is to be captured might be illuminated by multiple light sources. In one such case, a meter sensor (using, for example, a meter sensor that does not have a focusing lens) detects light from another light source that is not detected by the image sensor. Accordingly, the white balance gain accuracy can be affected as a result of different color temperatures between the detected and undetected light sources.

As an example, an image might be captured using an image sensor that primarily detects lights from objects that are illuminated largely by background lighting. However the meter sensor detects light not only from objects that are illuminated by background lighting, but also detects light from a secondary light source such as a high intensity desk lamp. Where the lamp provides cooler temperature light that is captured by the meter sensor (but not the image sensor), the resulting image from automatic white balancing may result in an image having a warmer temperature than would result when the desk lamp is not present.

This effect can be minimized by combining image information as a complement to the meter sensor information. Image information can be combined in a complimentary fashion by using information of gray points that are close to the image light source points. For example, the number of pixels (captured by the image sensor) within a "small" color radius of a cluster using the (G/B, G/R) coordinate system can be counted to produce a value Ni for the cluster. A color radius can be (in one embodiment) a value of around 3 using the (G/B, G/R) coordinate system illustrated in FIG. 5. The color radius can be as large as 10 (or larger) and still provide improvements in image quality.

A number "Ni" is determined for each cluster to produce a series of values for Ni. Each value for Ni for each cluster is adjusted using Vi=F (Ni), where Vi is the weighting factor for each cluster and Fo is a function such as a squaring function: $y=x^2$. Thus, clusters having a larger number of pixels within the counting radius are even more heavily emphasized. The adjusted set of weights Vi is used to produce a second set of weights that is adjusted using information from the image set. The new set of weights can be determined using NWi=Wi*Vi, where NWi is each weight adjusted by image information, Wi is each weighting faction (such as described above with respect to normalization) and Vi is the adjusted set of weights (produced by the squaring function, for example). An new image adjusted balancing point (adjusted using sensor and image information) can be determined in similar fashion as described above using IABP=sum (NWi*LIi), where IABP is an image-adjusted balancing point, NWi is each normalized weighting factor derived from a pixel count within a distance of a cluster, and LIi is each cluster point of the image sensor. The image-adjusted balancing point can then be selected as the white balancing point for an automatic white balancing routine for balancing the image to produce an automatically white balanced image.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image sensor system, comprising:
   a meter sensor comprising pixels that are arranged to produce a meter image that includes color information for pixels in the meter image, wherein the meter sensor has associated meter sensor color calibration information of a calibration image that includes monochromatic information that is sequentially illuminated by light sources having differing color temperatures;
   an image sensor comprising pixels that are arranged to produce a captured image that includes color information for pixels in the captured image, wherein the image sensor has associated image sensor color calibration information of the calibration image that includes monochromatic information that is sequentially illuminated by light sources having differing color temperatures, wherein the meter sensor includes a meter pixel array that is smaller than an image pixel array of the image sensor;
   an object lens disposed over the image sensor to focus light onto the image sensor;
   a diffusion lens disposed over the meter sensor to increase an angle of incident light relative to the object lens and to produce a smeared image on the meter sensor; and
   processing logic that is arranged to determine a white balancing point for balancing a secondary image of an illuminated scene captured by the image sensor, wherein the white balancing point is determined in response to the meter sensor color calibration information, the image sensor color calibration information, and color information from a secondary meter sensor image produced by the meter sensor capturing the illuminated scene.

2. The image sensor system of claim 1, wherein associated meter sensor color calibration information is determined using coordinates of a color space having a vertical component that is determined by dividing a first color value by a second color value, and having a horizontal component that is determined by dividing the first color value by a third color value, and wherein the first, second, and third color values are determined by respectively averaging values of the first, second, and third colors in the calibration image.

3. The image sensor system of claim 1, wherein the processing logic is further arranged to determine a white balancing point in response to a meter weight of each of the light sources having differing color temperatures that are used to illumine the calibration image, wherein each meter weight is determined in response to the meter sensor color calibration information and an average color value for each color in a captured image.

4. The image sensor system of claim 3, wherein the white balancing point is further determined in response to an image weight that is determined in response to each sensor weight.

5. The image sensor system of claim 4, wherein each sensor weight is normalized as a function of a supplied distance.

6. The image sensor system of claim 5, wherein each sensor weight is normalized by dividing a sensor weight by the sum of the sensor weights.

7. The image sensor system of claim 1, wherein the diffusion lens disposed over the meter sensor is smaller than the object lens disposed over the image sensor.

8. The image sensor system of claim 7, wherein the diffusion lens is disposed closer to the meter sensor than the object lens is disposed to the image sensor.

9. An image sensor system, comprising:
an image sensor that is exposed with light from an illuminated scene to produce a secondary image;
a meter sensor that is exposed with light from the illuminated scene to produce a meter secondary image, wherein the meter sensor includes a meter pixel array that is smaller than an image pixel array of the image sensor;
an object lens disposed over the image sensor to focus light onto the image sensor;
a diffusion lens disposed over the meter sensor to increase an angle of incident light relative to the object lens and to produce a smeared image on the meter sensor; and
an image processor that is configured to determine an average pixel color in the secondary image and to determine a white balancing point in response to the average pixel color in the secondary image, the meter secondary image, meter calibration information for the meter sensor, and image calibration information for the image sensor.

10. The image sensor system of claim 9, wherein the meter calibration information has been determined by sequentially illuminating a calibration scene using a series of light sources with differing color temperatures to produce a series of meter calibration images and by using a meter calibration image to determine a meter cluster point in a first color space for each of the light sources in the series of light sources.

11. The image sensor system of claim 10, wherein the image calibration information has been determined by sequentially illuminating a calibration scene using the series of light sources with differing color temperatures to produce a series of image calibration images and by using an image calibration image to determine an image cluster point in a second color space for each of the light sources in the series of light sources, wherein each image cluster point is associated with a corresponding meter cluster point.

12. The image sensor system of claim 11, wherein the first and second color spaces use the same coordinate system.

13. The image sensor system of claim 12, wherein a first axis of the coordinate system is determined by dividing a first color by a second color, and a second axis of the coordinate system is determined by dividing a first color by a third color, wherein the first, second, and third colors are colors represented in the secondary image.

14. The image sensor system of claim 12, wherein the image processor is further configured to converting the secondary image average pixel color to a first point in the first color system.

15. The image sensor system of claim 14, wherein the image processor is further configured to determining a series of meter weights as a function of each distance between the first point and each meter cluster point.

16. The image sensor system of claim 15, wherein the image processor is further configured to determining a series of image weights, wherein each image weight is determined as a function of the corresponding meter weight.

17. The image sensor system of claim 16, wherein the image processor is further configured to determining a second point in the second color space as a function of the series of image weights.

18. The image sensor system of claim 17, wherein the image processor is further configured to using the second point as a white balancing point to balance the secondary image.

19. The image sensor system of claim 15, wherein the image processor is further configured to converting pixels of the captured secondary image to points in the second color space, counting the number of converted pixels within a color radius of an image cluster, and determining a series of image weights, wherein each image weight is determined as a function of the corresponding meter weight and the number of converted pixels within the color radius of each image cluster.

20. The image sensor system of claim 19, wherein the image processor is further configured to determining a second point in the second color space as a function of the series of image weights, and using the second point as a white balancing point to balance the secondary image.

21. A method for white balancing, comprising:
exposing an image sensor having an image pixel array with light from an illuminated scene to produce a secondary image;
exposing a meter sensor having a meter pixel array with light from the illuminated scene to produce a meter secondary image, wherein the meter pixel array is smaller than the image pixel array;
determining an average pixel color in the secondary image; and
determining a white balancing point for the secondary image in response to the average pixel color in the secondary image, the meter secondary image, meter calibration information for the meter sensor, and image calibration information for the image sensor,
wherein an object lens is disposed over the image sensor to focus light onto the image sensor and a diffusion lens is disposed over the meter sensor to increase an angle of incident light relative to the object lens and to produce a smeared image on the meter sensor.

22. The method of claim 21, wherein the meter calibration information has been determined by sequentially illuminating a calibration scene using a series of light sources with differing color temperatures to produce a series of meter calibration images and by using a meter calibration image to determine a meter cluster point in a first color space for each of the light sources in the series of light sources.

23. The method of claim 22, wherein the image calibration information has been determined by sequentially illuminating a calibration scene using the series of light sources with differing color temperatures to produce a series of image calibration images and by using an image calibration image to determine an image cluster point in a second color space for each of the light sources in the series of light sources, wherein each image cluster point is associated with a corresponding meter cluster point.

24. The method of claim 23, wherein the first and second color spaces use the same coordinate system.

25. The method of claim 24, wherein a first axis of the coordinate system is determined by dividing a first color by a second color, and a second axis of the coordinate system is determined by dividing a first color by a third color, wherein the first, second, and third colors are colors represented in the secondary image.

26. The method of claim 24, further comprising converting the secondary image average pixel color to a first point in the first color system.

27. The method of claim 26, further comprising determining a series of meter weights as a function of each distance between the first point and each meter cluster point.

28. The method of claim 27, further comprising determining a series of image weights, wherein each image weight is determined as a function of the corresponding meter weight.

29. The method of claim 28, further comprising determining a second point in the second color space as a function of the series of image weights.

30. The method of claim 29, further comprising using the second point as a white balancing point to balance the secondary image.

31. The method of claim 27, further comprising converting pixels of the captured secondary image to points in the second color space, counting the number of converted pixels within a color radius of an image cluster, and determining a series of image weights, wherein each image weight is determined as a function of the corresponding meter weight and the number of converted pixels within the color radius of each image cluster.

32. The method of claim 31, further comprising determining a second point in the second color space as a function of the series of image weights, and using the second point as a white balancing point to balance the secondary image.

* * * * *